(12) United States Patent
Gardavsky et al.

(10) Patent No.: US 7,266,468 B1
(45) Date of Patent: Sep. 4, 2007

(54) STRUCTURAL DATA ANALYSIS SYSTEM

(75) Inventors: Jiri Gardavsky, Heroldsberg (DE); Jim Roan, Ann Arbor, MI (US); Yu Guo, Canton, MI (US); Hannes Loferer, Ann Arbor, MI (US); Richard A. Krakowski, Troy, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 11/367,802

(22) Filed: Mar. 3, 2006

(51) Int. Cl.
*G01D 1/00* (2006.01)

(52) U.S. Cl. .................................... 702/127
(58) Field of Classification Search ............. 702/127
See application file for complete search history.

(56) References Cited

U.S. PATENT DOCUMENTS 6,125,235 A * 9/2000 Padilla et al. ............... 703/11

FOREIGN PATENT DOCUMENTS

JP 2004127304 A 4/2004

* cited by examiner

*Primary Examiner*—John Barlow
*Assistant Examiner*—Stephen J Cherry
(74) *Attorney, Agent, or Firm*—Brinks Hofer Gilson & Lione

(57) ABSTRACT

A system and method for identifying significant bivariate checkpoints. The system includes a controller configured to receive measurements for a plurality of checkpoints and calculate the covariance and correlation for each checkpoint pair. The controller identifies significant bivariate checkpoints based on the covariance between the checkpoint pairs. Further, the controller may also calculate the correlation for each checkpoint pair and identify the significant bivariate checkpoints based on a combination of the covariance and the correlation between the checkpoints. Further, the controller may rank the significant bivariate checkpoints and provide the significant bivariate checkpoints to a principal component algorithm.

17 Claims, 5 Drawing Sheets

STRUCTURAL DATA ANALYSIS SYSTEM

FIELD OF THE INVENTION

The present invention generally relates to a structural data analysis system and method to identify significant process patterns and process events.

BACKGROUND

Many systems and methods have been developed to collect and statistically analyze data and data sets. These systems and methods have become increasingly important in complex manufacturing processes, such as those employed by the automotive industry. In the automotive industry, the build of a vehicle can be controlled and monitored by measuring a number of geometric features on each vehicle as they are produced. The geometric feature may include a hole, corner, edge, plane, or similar geometric shape on the vehicle or of a vehicle substructure. Geometric features subject to quantitative dimensional measurement are conventionally named as checkpoints. The checkpoints generate as a result of the geometric measurement real numbers indicating dimensional properties of the individual car bodies or of their subassemblies. These numbers are related to the dimensional variation of tools, robots, etc., in manufacturing process and to the component variability and handling. Sets of these numbers form the process data. Vehicle geometric quality and the manufacturing process stability can be considerably improved and manufacturing costs can be greatly reduced by quickly identifying and fixing problems in the manufacturing process that lead to dimensional variation in the build of the vehicle. Accordingly, many systems measure every vehicle in the manufacturing process to quickly identify trends, and they would stop the manufacturing process if vehicles or subcomponents are being built outside of the vehicle specification. Although inline systems can provide a quick indication that a problem exists, identifying the root cause of the problem has been a time consuming activity of manually run analyses, requiring expert teams with significant process knowledge to intuitively look at the data and identify the root cause of the problem through trial and error approaches.

One tool used by the process knowledgeable people to determine the root cause of the problem is principal component analysis. However, the process knowledgeable person must select the relevant checkpoints manually and identify intuitively patterns that are forming by and between various checkpoints being measured in the process. Although principal component analysis can identify major variation patterns and describe each variable's contribution in quantitative terms, principal component analysis is ineffective in processes with large ensembles of checkpoints, including sets of checkpoints unrelated to the process perturbation to be identified and quantified.

In view of the above, it is apparent that there exists a need for an unbiased and improved analysis method and system, to identify and locate significant process patterns and events in the geometric dimensional variation of the checkpoints.

SUMMARY

In satisfying the above need, as well as overcoming the enumerated drawbacks and other limitations of the related art, the present invention provides a method and system to perform structural data analysis to identify significant checkpoints related to process patterns and process events.

Systems may identify process events and patterns by means of calculating, identifying and ordering significant bivariates. The significant bivariates will be identified as pairs of variables in the ensembles of the sets of process data. The process data may be extracted from a real data source measurement engine. The manufacturing process will be discussed as an illustrating example. The data may consist of (real) numbers, labeled by the names of the variables. In perturbed processes there may emerge process patterns that are related to some specific properties shared by a specific group of variables. These patterns may eventually develop with time into the process events. Process events are variations in the process, reducing the process capability, and they are expected to issue process improvement activities, warnings, or even a stop of the process, whenever applied to processes subject to an inspection and control. Process improvement activities to be based on the system described herein are directed to identify, locate and remove the causes of the process events (lowering the risk of the process stops), and to reduce the extent of the process perturbation patterns (continuous improvement of the process capability). The described embodiment of this invention includes a method and system for identifying process patterns, locating process patterns and process events, and generating reports and warnings for the process inspection and control.

In accordance with one embodiment of the present invention, a controller is configured to receive geometric dimensional measurements for a plurality of checkpoints and calculate the covariance and the correlation for all checkpoint pairs. Further, the controller will identify the significant bivariate checkpoint pairs (bivariates) based on a combination of the covariance and the correlation values between all checkpoints. Further, the controller may rank the significantly bivariate checkpoints and provide their ordered sequence to a principal component algorithm.

The controller may be in communication with the sensor to automatically acquire geometric dimensional data for the checkpoints and automatically update the data window when additional data is acquired. The controller may also be in electrical communication with an alarm system to create an alarm based on the significant bivariate checkpoints and to report on the alarm.

In yet another aspect of the present invention, the controller may be configured to identify significant bivariates by detecting checkpoints that have a covariance greater than a covariance threshold and/or a correlation greater than a correlation threshold. Further, the controller may be configured to rank each significant bivariate and, accordingly, reorder or truncate the sequence of the significantly bivariate checkpoints. This can greatly improve the operation of a subsequent principal component analysis algorithm configured to process the significantly bivariate checkpoints. The significantly bivariate checkpoints may be ranked based on variation, a covariance norm, a pattern matching algorithm, or other method. In addition, the controller may be configured to display an image based on the significant bivariates. For example, the image may include a vehicle graphic and arrows where the arrows correspond to the geometric orientation and magnitude of the significantly bivariate checkpoints.

Further objects, features and advantages of this invention will become readily apparent to persons skilled in the art after a review of the following description, with reference to the drawings and claims that are appended to and form a part of this specification.

DETAILED DESCRIPTION

Figure 1:
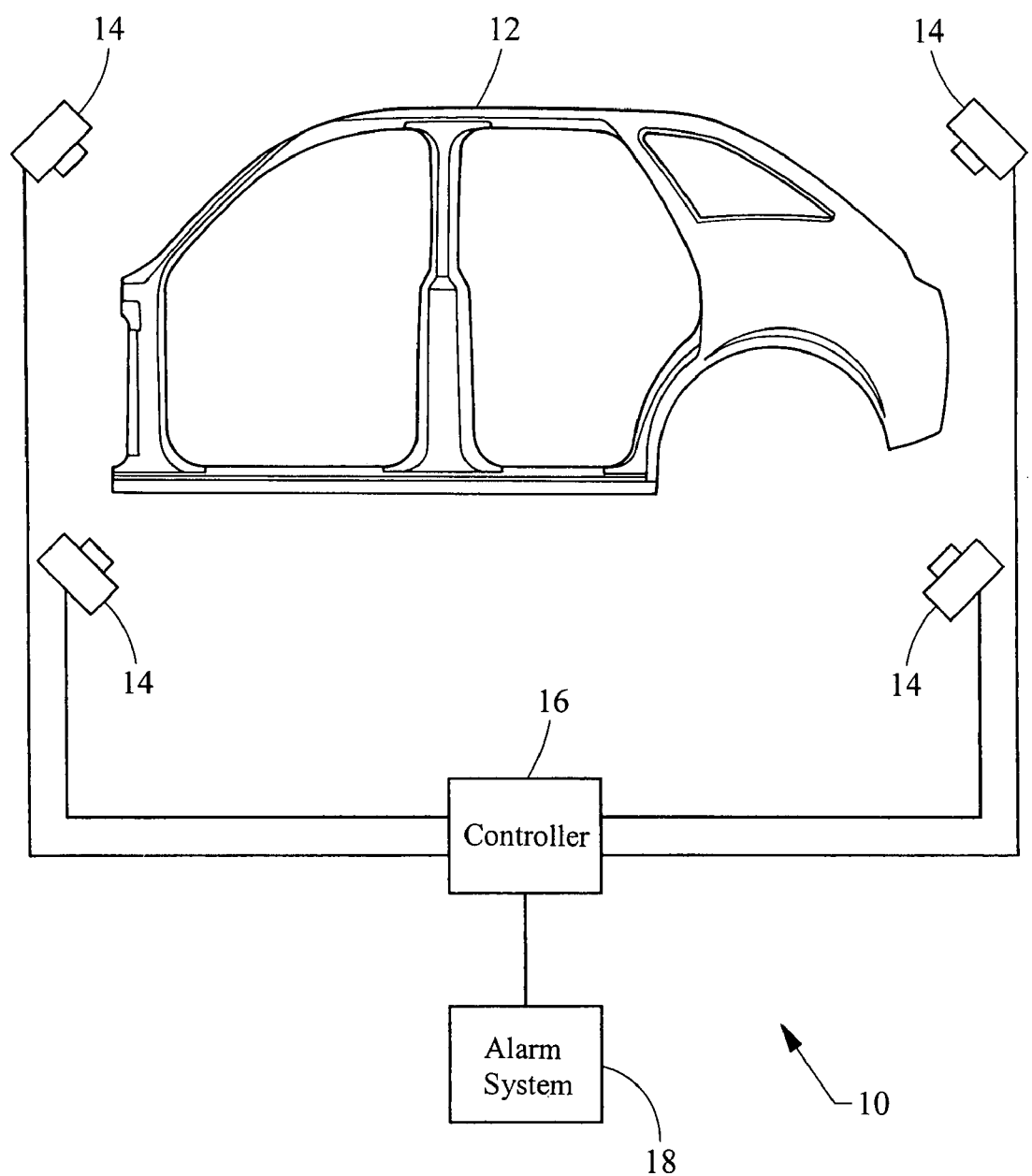
FIG. 1 is a schematic view of a system for structural data analysis in accordance with one embodiment of the present invention.

Referring now to FIG. 1, a system embodying the principles of the present invention is illustrated therein and designated at 10. The system 10 includes a controller 16 and at least one sensor 14. There may be a number of sensors 14 located about a vehicle body or frame 12 to measure geometric dimensional deviations at a number of specified locations. Alternatively, a single sensor may be used along with a motion device such that the sensor 14 is able to measure multiple features along the vehicle body 12. For example, the sensor 14 may be attached to a robotic arm that can be manipulated to measure a number of features at various locations on the vehicle body 12. The sensor 14 is in electrical communication with the controller 16 to provide a set of data for each feature measured. The controller 16 includes a microprocessor configured to analyze the data. In addition, the controller 16 is in communication with an alarm system 18 to generate an alert based on the measurements from the sensor 14. The alarm system 18 may comprise a visual indicator such as a flashing light, an audio indicator such as a siren, or both. In addition, the alarm system 18 may comprise a communication system configured to send an email, phone message, pager message, or similar alert.

Figure 2:
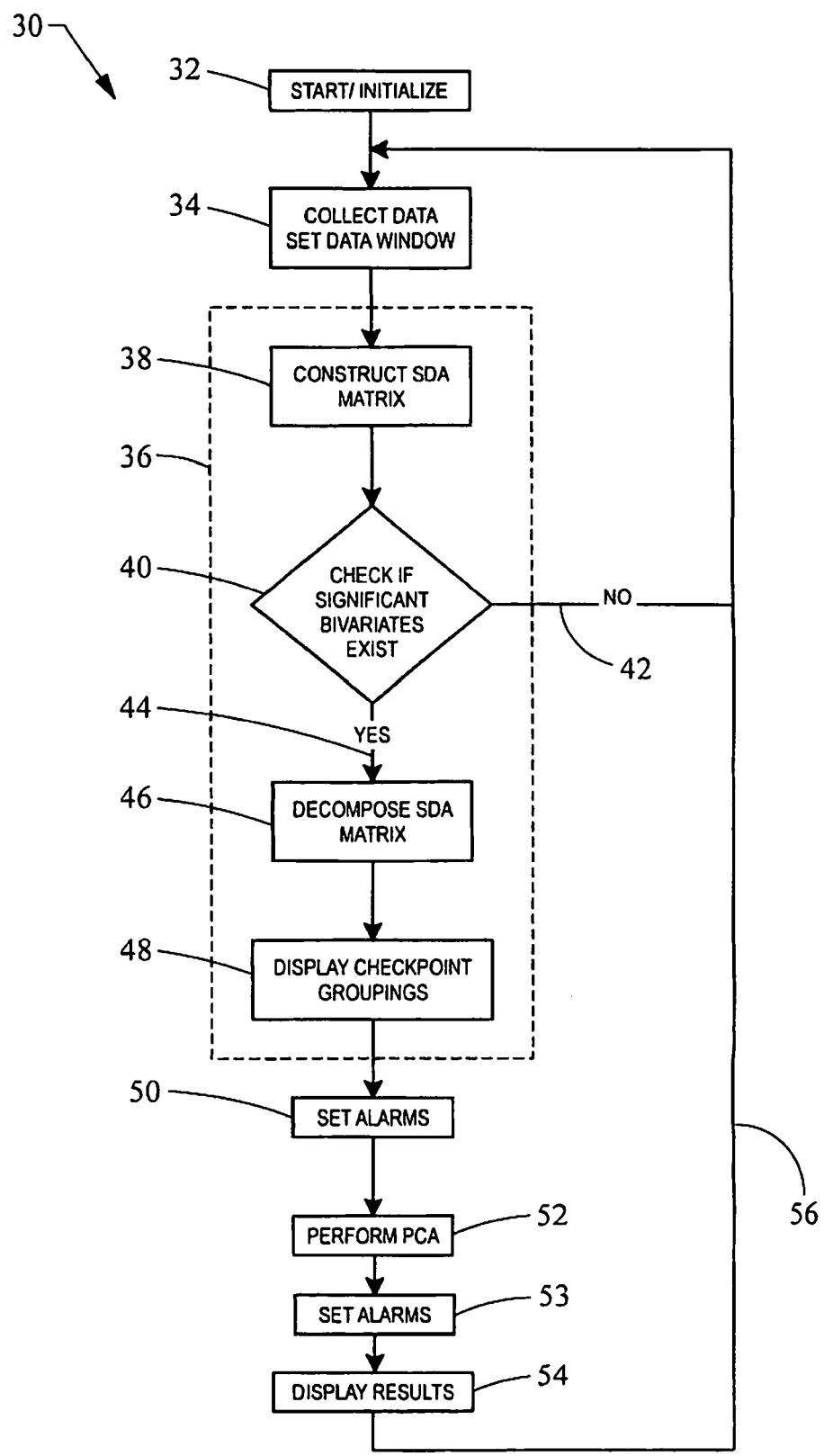
FIG. 2 is a flow chart illustrating the logic for performing a structural data analysis in accordance with one embodiment of the present invention.

Now referring to FIG. 2, the logic for analyzing data is provided in method 30. Method 30 starts in block 32 where the data are initialized. In block 34, the data are collected and a data window for processing is set. For example, data may be acquired from sensor 14 for multiple vehicles and provided to the controller 16. The controller 16 then stores the data for a number of preceding measurements for each feature and adds newly acquired data as it becomes available. In one example, the controller 16 may set the data window for the last thirty measurements for a feature. Accordingly, as a new measurement is acquired by the sensor 14, the data window is shifted to include the newly acquired data and the previous twenty nine measurements. The measurement acquired thirty cycles previously is removed from the data window. Of course, the data window is configurable and each feature may have the same or different size data windows. The logic then enters the structural data analysis (SDA) portion 36 of the method 30. As denoted by block 38, the data is used to construct an SDA matrix.

Figure 3:
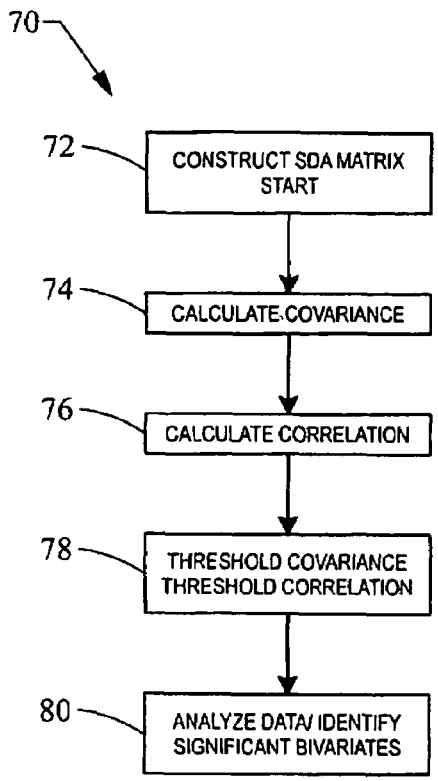
FIG. 3 is a flow chart of logic to construct a structural data analysis matrix in accordance with one embodiment of the present invention.
Figure 4:
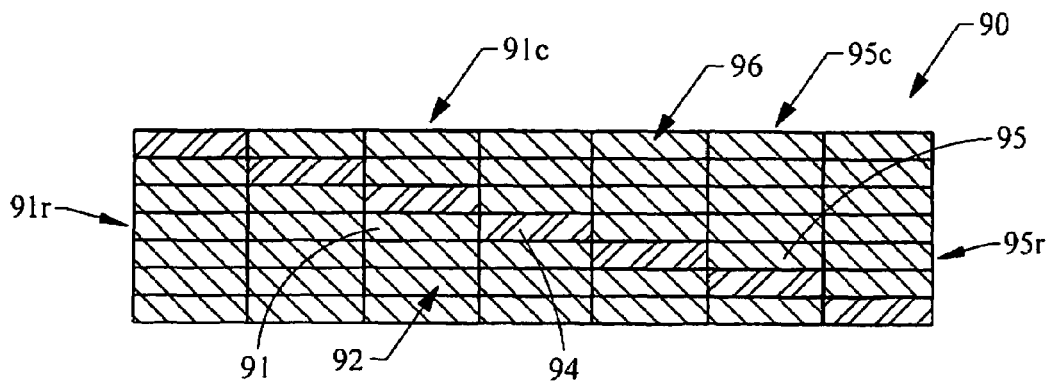
FIG. 4 is an illustration of the structural data analysis matrix in accordance with one embodiment of the present invention.

In one embodiment of the present invention, the SDA matrix is constructed in accordance with method 70, illustrated in FIG. 3. The method starts in block 72 where the SDA matrix is initialized. In block 74, the covariance between each pair of data points is calculated. A representation of the SDA matrix is shown in FIG. 4 and denoted by reference numeral 90. Each row and column represents a different checkpoint. Each checkpoint is listed in the same order along each row and each column. Since the order is the same for the listing of rows and columns, a diagonal 94 is created where the checkpoint for row "n" is the same as the checkpoint for the corresponding column "n". The covariance is calculated between the checkpoint for each row and the checkpoint for each column. The covariance is then placed in a corresponding cell on the lower half 92 of the matrix 90 below the diagonal 94. For example, the covariance between the checkpoint corresponding to column 91c and the checkpoint corresponding to row 91r is calculated. The resulting covariance value is placed into the corresponding cell 91 in the SDA matrix 90. This process is repeated for each checkpoint combination and as such, each cell in the lower half 92 of the matrix 90 is filled. In addition, the correlation is calculated between each checkpoint for each row and each column. The correlation is placed in a corresponding cell in the upper half 96 of the matrix 90 above the diagonal 94. For example, the correlation between the checkpoint corresponding to row 95r and the checkpoint corresponding to column 95c is calculated. The resulting value is placed into the corresponding cell 95 in the upper half 96 of the matrix 90. This process is repeated for each checkpoint combination and as such, each cell in the upper half 96 of the matrix 90 is filled.

Referring again to FIG. 3, the calculation of the correlation is denoted by block 76. The maximum covariance and minimum covariance for each cell on the lower half 92 of the matrix 90 is stored. Accordingly, the maximum and minimum covariance can be used to normalize the value in each cell in the lower half 92 of the matrix 90 for the purposes of matrix decomposition. As denoted by block 78, the significant bivariates in the SDA matrix are identified in block 80. As such, if the correlation between a pair of checkpoints is greater than a correlation threshold and the covariance between two checkpoints is greater than a covariance threshold level, then the checkpoint pairs are identified as a significant bivariate. In one embodiment, the significant bivariates are identified according to equation 1 below.

$|Cor(Xi,Xj)| > \text{LEVEL}(Cor)$, and

If simultaneously $$|Cov(Xj,Xi)| > \text{LEVEL}(Cov) \qquad (1)$$

Therefore, the identification of a significant bivariate is conditioned on the level of correlation and the level of covariance between the checkpoints. Correlation is generally expressed in units of percent, however, correlation may be scaled into the interval of [−1, 1]. Covariance provides quadradic sizing for the correlated portion of the variation between the checkpoints, of the explained variation. For example, with geometric variables, the unit of covariance may be $mm^2$. The correlation threshold and covariance threshold can be determined based on default values, or alternatively may be determined based on recent process data, based on the boundary conditions of the system variables, or determined by means of statistics on historical data.

Referring again to FIG. 2, the controller 16 determines if significant bivariates exist as denoted by block 40. If no significant bivariates exist, the logic follows along line 42 where additional data may be collected or the data window reset as denoted by block 34. However, if significant bivariates do exist, logic flows along line 44 to block 46.

Figure 5:
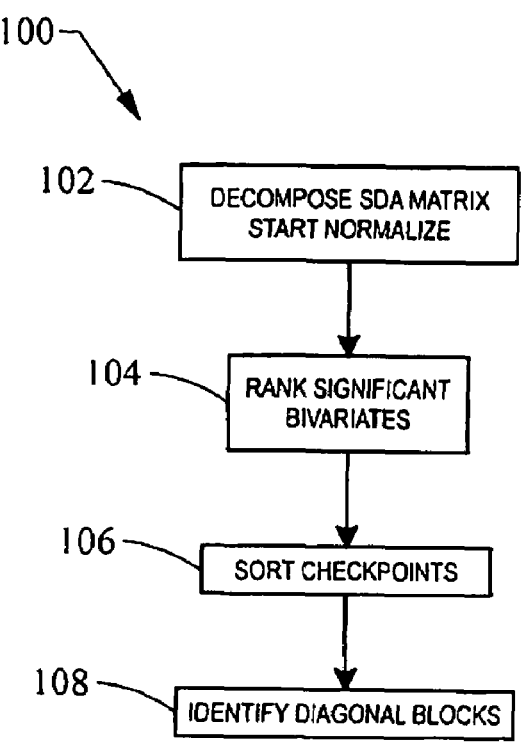
FIG. 5 is a flow chart of the logic for decomposing the structural data analysis matrix in accordance with one embodiment of the present invention.

In block 46, the SDA matrix is decomposed, for example, according to the method 100 provided in FIG. 5. The method 100 starts in block 102 where the covariance values in the lower half 96 of the matrix 90 are normalized based on the maximum and minimum covariance previously stored. As such, the interval of the covariance values in the lower half of the matrix 92 should match the interval of the upper half 96 of the SDA matrix containing the correlation values for each pair of checkpoints. In block 104, a bivariate ranking is calculated for each checkpoint. The bivariate ranking may be based on various techniques. However, three techniques have proven particularly useful.

The first technique includes ranking each bivariate checkpoint based on the covariance norm for that checkpoint. Sorting by the checkpoint covariance norm ranks the checkpoints according to their overall covariant response to all process perturbation patterns. Further, the checkpoint covariant norm considers the dimensional response [mm^2] of a particular checkpoint relative to all other checkpoints. The checkpoint covariant norm may be calculated according to the relationship:

Having an N×N covariance matrix, let $i=1,2,\ldots N$ denote the index of the row, and let $j=1,2,\ldots N$ denote the index of the columns. The matrix elements are real numbers $Cov(X_i, Y_j)$, calculated from the sets of variables $X_i$, $Y_j$. Then the checkpoint covariance norm for the k-th checkpoint is defined by:

$$\{SUM[(Cov(X_i,Y_j))^2], \text{ with } j=1,2,\ldots k-1, \text{ with fixed } i=k,$$

$$\text{Plus } SUM[(Cov(X_i,Y_j))^2]\}, \text{ with } i=k+1, k+2, \ldots N, \text{ with fixed } j=k \quad (3)$$

As such, the first sum runs along the k-th row associated with the k-th checkpoint, and the second sum runs along the k-th column associated with the k-th checkpoint.

The second technique includes ranking the bivariates based on a pattern matching algorithm. This technique makes use of the phenomenon, that clusters of bivariates tend to form along the diagonal 94 (in FIG. 4) of the SDA matrix 90 (in FIG. 4). As such, large blocks of bivariates that form symmetrically about the diagonal in both the top half and bottom half of the matrix can be identified geometrically using a pattern matching algorithm. The pattern matching algorithm may be configured to assign bivariate cells to a cluster based on the location (row and column) of that cell relative to the location of other bivariate cells. Each cell in a cluster may be ranked based on the size (number of cells) of the cluster, the symmetry of the cluster about the diagonal, and/or the value (covariance or correlation value) contained by the cell. The pattern matching techniques discussed above are exemplary, accordingly, other pattern matching techniques may also be used.

The third technique is straightforward and includes ranking each bivariate checkpoint based on the six Sigma variation of that checkpoint. Accordingly, the six Sigma variation may be obtained from the Cov-matrix according to equation 2 below:

$$6*Sigma(X_k) = 6*SQRT[Cov(X_k, X_k)] \quad (2)$$

In this instance, the checkpoint with the highest six Sigma variation would pivot the bivariate ranking, corresponding to the most significant bivariate. This ranking may be advantageous for monitoring process patterns and events related to the highest 6*Sigma variation.

Figure 6:
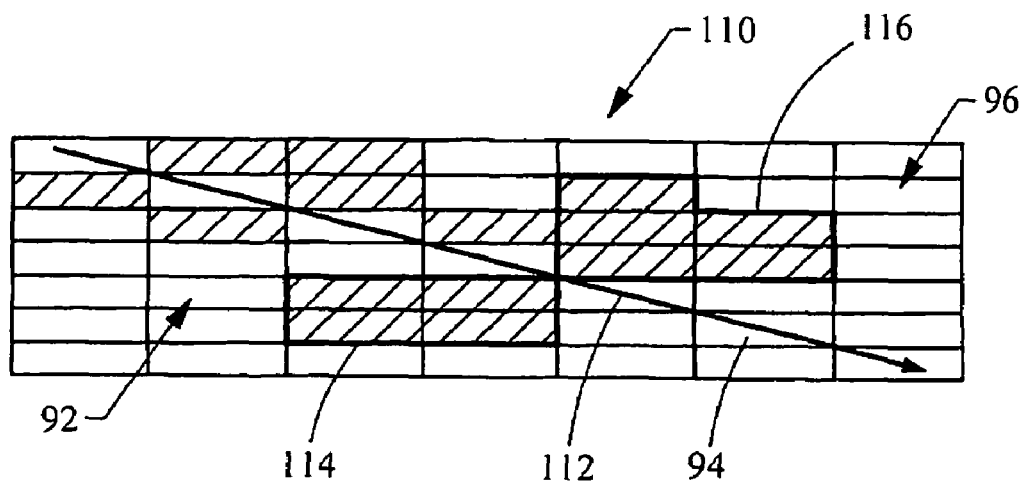
FIG. 6 is a illustration of the decomposed structural data analysis matrix in accordance with one embodiment of the present invention.

The bivariate rankings are entered into the diagonal 94 of the SDA matrix 90. In block 106, the checkpoints are sorted from highest to lowest based on the bivariate ranking for each checkpoint. The updated decomposed matrix is provided in FIG. 6 and is denoted by reference numeral 110. As such, the bivariate ranking values along the diagonal 94 are listed in order from the highest value at the uppermost left corner of the matrix 110 and the lowest value at the lowermost corner of the matrix 110.

Figure 7:
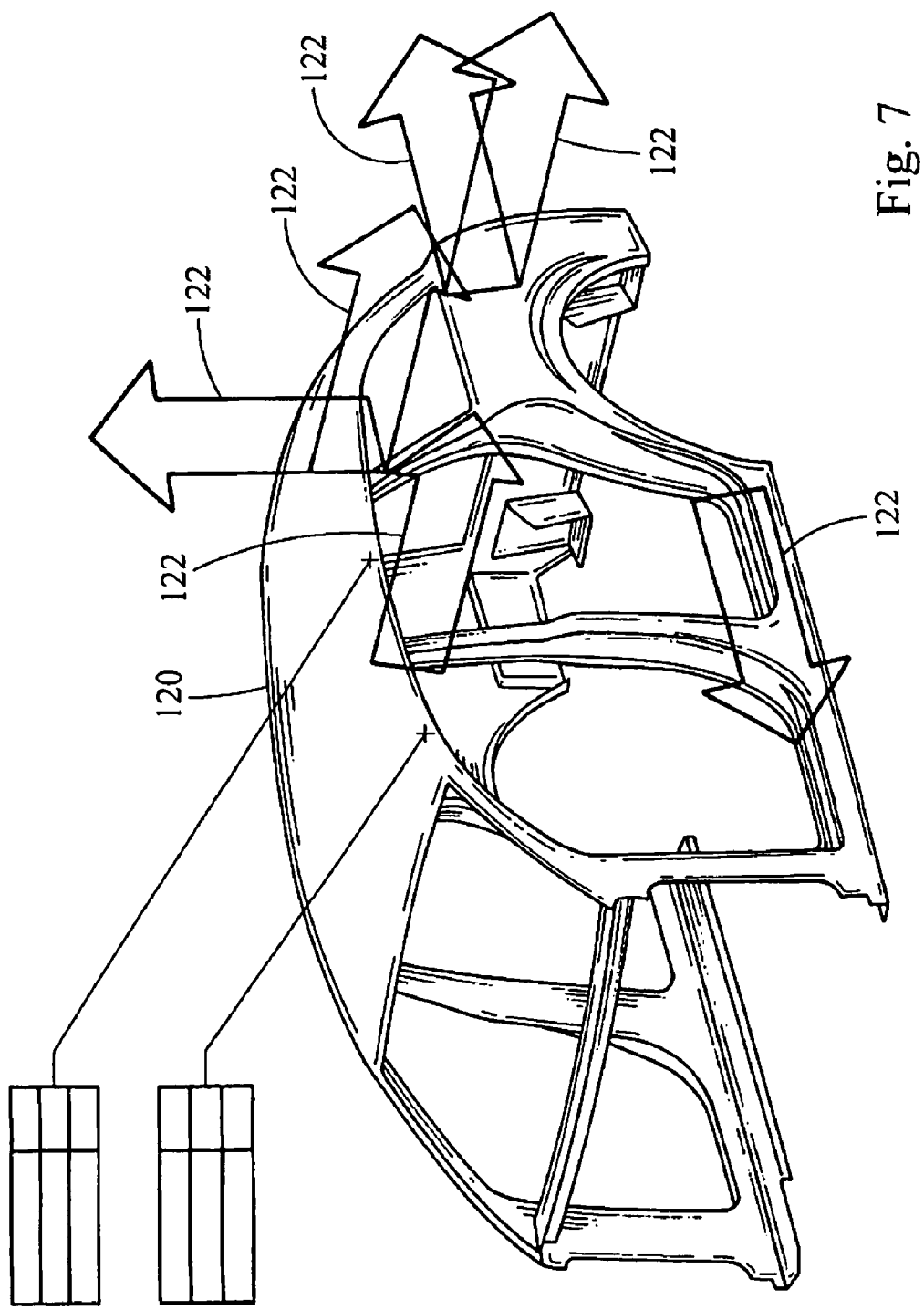
FIG. 7 is an illustration of a display based on the significantly bivariate checkpoints.

The significant bivariates as determined by equation 1 may be used to generate the decomposed matrix 110. Other checkpoints that are not classified as significant bivariate are omitted. In addition, the significant bivariates comprising the decomposed matrix may be further limited or truncated based on the bivariate rankings discussed above. For visualization purposes, the cells 114 containing values above the correlation threshold are highlighted, for example bolded and written in a color red. Similarly, the cells 116 including a correlation value above the correlation threshold are highlighted. The highlighted cells are shown in cross hatch and denoted by reference numeral 114 or 116. As noted above, cells 114 and 116 form groupings or blocks along the diagonal 94. Blocks are identified along the diagonal as denoted by reference numeral 108. These blocks may be identified using geometric rules based on the number, location, strength of correlation, or strength of covariance. The matrix as such provides a good visual indication of the grouping of checkpoints and the inter-relation of the variance between them. As such, the matrix can be displayed as a visual analysis tool as denoted by block 48 of FIG. 2. Further, the blocks may be identified and accordingly arrows 122 may be rendered on a graphical representation of the vehicle 120 near the corresponding location of the checkpoint as shown in FIG. 7. As such, the arrows 122 may correspond to the correlation or covariance between the checkpoints and the length or width of the arrow may correspond to the correlation, covariance, or covariance norm of the checkpoints.

In addition, alarms may be set based on the structural data analysis, as denoted by block 50. The alarms may be activated if a significant bivariate is identified or based on the covariance, correlation, bivariate rankings (including, but not limited to, the covariance norm) and/or any combination thereof, for the bivariate checkpoints. The alarms may include audio alarms, visual alarms such as lights or screen messages, or alarm messages may be sent via the network in email or pager, text message, or other telecommunications form.

For further root cause analysis, the significant bivariates or a subset of the significant bivariates can be provided to a principal component analysis algorithm as denoted by block 52. Alarms may be set based on the principal component analysis as denoted by block 53. The alarms may be activated when a significant mode change occurs between two successive principal component analysis executions. In addition, the results of the principal component analysis algorithm can be provided to a display and rendered as a graphical representation of the vehicle with arrows denoting the direction and amplitude of variation from the principal component analysis as denoted by block 54. The method may be automated by returning along line 56 to block 34 where additional data may be automatically collected from sensors and the data window reset, for example by a running window as previously described.

The causal pathways of variation in the process are expected to be located on the significant bivariates. The causal pathways can be more easily recognized in the SDA matrix by means of database operations, highlighting or listing of the significant bivariates. Moreover, those skilled in database operations may achieve specific visualization suitable for his particular objective of investigation. Other database operations make it possible to export the structural data analysis information including significant bivariates and the causal pathways for the purposes of reporting and further information processing such as principal component analysis.

As a person skilled in the art will readily appreciate, the above description is meant as an illustration of implementation of the principals this invention. This description is not intended to limit the scope or application of this invention in that the invention is susceptible to modification, variation and change, without departing from the spirit of this invention, as defined in the following claims.

We claim:

1. A system for performing structural data analysis of a physical structure, the system comprising:
    at least one sensor for measuring coordinates for a plurality of checkpoints formed by the physical structure;
    a controller in electrical communication with the at least one sensor for receiving data, the controller being configured to identify significant bivariate checkpoints based on a combination of the covariance and correlation for each checkpoint,
    wherein the significant bivariate checkpoints are identified by detecting checkpoints from the plurality of checkpoints with a covariance greater than a covariance threshold.

2. The system according to claim 1, wherein the significant bivariate checkpoints are identified by detecting checkpoints from the plurality of checkpoints with a correlation greater than a threshold correlation.

3. The system according to claim 1, wherein the processor automatically updates a data window for the controller when additional data is acquired.

4. The system according to claim 1, further comprising a display, the controller being configured to render an image on a display based on the significant bivariate checkpoints.

5. The system according to claim 4, wherein the image includes a vehicle graphic and arrows that are depicted on the vehicle graphic corresponding to a location of the significant bivariate checkpoints.

6. A system for performing structural data analysis of a physical structure, the system comprising:
    at least one sensor for measuring coordinates for a plurality of checkpoints formed by the physical structure;
    a controller in electrical communication with the at least one sensor for receiving data, the controller being configured to identify significant bivariate checkpoints based on a combination of the covariance and correlation for each checkpoint,
    wherein the significant bivariate checkpoints are identified based on the covariance norm for each checkpoint.

7. A system for performing structural data analysis of a physical structure, the system comprising:
    at least one sensor for measuring coordinates for a plurality of checkpoints formed by the physical structure;
    a controller in electrical communication with the at least one sensor for receiving data, the controller being configured to identify significant bivariate checkpoints based on a combination of the covariance and correlation for each checkpoint,
    wherein the processor is configured to initiate an alarm based on the significant bivariate checkpoints.

8. A system for performing structural data analysis of a physical structure, the system comprising:
    at least one sensor for measuring coordinates for a plurality of checkpoints formed by the physical structure;
    a controller in electrical communication with the at least one sensor for receiving data, the controller being configured to identify significant bivariate checkpoints based on a combination of the covariance and correlation for each checkpoint,
    wherein the controller is configured to rank each significant bivariate checkpoint.

9. The system according to claim 8, wherein the controller is configured to rank each significant bivariate checkpoint based on the variation of the significant bivariate checkpoint.

10. The system according to claim 8, wherein the controller is configured to rank each significant bivariate checkpoint based on the covariance norm of the significant bivariate checkpoint.

11. The system according to claim 8, wherein the controller is configured to rank each significant bivariate checkpoint based on a pattern matching algorithm.

12. The system according to claim 8, wherein the significant bivariate checkpoints are provided to a principal component analysis algorithm.

13. A method for performing structural data analysis, the method including the steps of:
    receiving measurements for a plurality of checkpoints;
    calculating the covariance for each checkpoint;
    identifying significant bivariate checkpoints based on the covariance between each checkpoint,
    further comprising the step of ranking the significant bivariate checkpoints.

14. The method according to claim 13, further comprising the steps of:
    calculating the correlation for each checkpoint;
    identifying significant bivariate checkpoints based on a combination of the covariance and the correlation between each checkpoint.

15. The method according to claim 13, further comprising the step of providing the significant bivariate checkpoints to a principal component algorithm.

16. The method according to claim 13, further comprising the step of generating an alarm based on the significant bivariate checkpoints.

17. The method according to claim 13, further comprising the step of performing alarming based on results of principal component analysis.

* * * * *